United States Patent [19]

Lane et al.

[11] Patent Number: 4,899,005

[45] Date of Patent: Feb. 6, 1990

[54] METHOD FOR PREPARING CYCLOOLEFIN COPOLYMERS WITH IMPROVED HEAT STABILITY

[75] Inventors: Parley C. Lane, Cuyahoga Falls; Linwood P. Tenney, Hudson; George M. Benedikt, Macedonia; Paul T. Stricharczuk, Mayfield Heights, all of Ohio

[73] Assignee: The B. F. Goodrich Company, Akron, Ohio

[21] Appl. No.: 122,849

[22] Filed: Nov. 19, 1987

[51] Int. Cl.$^4$ .......................... C07C 2/76; C07C 13/28
[52] U.S. Cl. ...................................... 585/360; 585/362
[58] Field of Search ................................ 585/360, 362

[56] References Cited

U.S. PATENT DOCUMENTS

| | | |
|---|---|---|
| 1,720,029 | 7/1929 | Staudinger et al. . |
| 2,721,189 | 10/1955 | Anderson et al. . |
| 2,831,037 | 4/1958 | Schmerling . |
| 2,932,630 | 4/1960 | Robinson et al. . |
| 3,074,918 | 1/1963 | Elenterio . |
| 3,084,147 | 4/1963 | Wilks . |
| 3,330,815 | 7/1967 | McKeon et al. . |
| 3,367,924 | 2/1968 | Rinehart . |
| 3,467,633 | 9/1969 | Harris et al. . |
| 3,546,183 | 12/1970 | Vergne et al. . |
| 3,557,072 | 1/1971 | Vergne et al. . |
| 3,701,812 | 10/1972 | Gebhart, Jr. et al. . |
| 3,778,420 | 12/1973 | Brown et al. . |
| 3,781,257 | 12/1973 | Pampus et al. . |
| 3,790,545 | 2/1974 | Minchak . |
| 3,836,593 | 9/1974 | Streck et al. . |
| 3,853,830 | 12/1974 | Minchak . |
| 3,879,343 | 4/1975 | DeBrunner et al. . |
| 4,002,815 | 1/1977 | Minchak . |
| 4,020,021 | 4/1977 | Lahouste et al. . |
| 4,136,247 | 1/1979 | Tenney et al. . |
| 4,136,248 | 1/1979 | Tenney . |
| 4,136,249 | 1/1979 | Tenney et al. . |
| 4,138,419 | 2/1979 | Arakawa et al. . |
| 4,168,282 | 9/1979 | Schneider . |
| 4,178,424 | 12/1979 | Tenney et al. . |
| 4,239,874 | 12/1980 | Ofstead et al. . |
| 4,250,063 | 2/1981 | Kotani et al. . |
| 4,320,239 | 3/1982 | Schneider .......................... 585/360 |
| 4,357,449 | 11/1982 | Yi . |
| 4,380,617 | 4/1983 | Minchak et al. . |
| 4,400,340 | 8/1983 | Klosiewicz . |
| 4,426,502 | 1/1984 | Minchak . |
| 4,490,498 | 12/1984 | Yokota et al. . |
| 4,558,107 | 12/1985 | Evans et al. . |
| 4,568,660 | 2/1986 | Klosiewicz . |
| 4,584,425 | 4/1986 | Tom . |
| 4,598,102 | 7/1986 | Leach . |
| 4,689,380 | 8/1987 | Nahm . |
| 4,696,985 | 9/1987 | Martin . |
| 4,699,963 | 10/1987 | Klosiewicz . |
| 4,701,510 | 10/1987 | Minchak et al. . |
| 4,703,098 | 10/1987 | Matlack . |
| 4,708,969 | 11/1987 | Leach . |
| 4,748,216 | 5/1988 | Tom . |
| 4,751,337 | 6/1988 | Espy et al. . |

FOREIGN PATENT DOCUMENTS 60-26024 2/1985 Japan .
60-049051 3/1985 Japan .

Primary Examiner—Curtis R. Davis
Attorney, Agent, or Firm—Robbins & Laramie

[57] ABSTRACT

A process for increasing the molecular weight of cycloolefin monomers is provided by this invention which can be incorporated into ring-opening polymerization methods. This method is particularly suited for bulk polymerization processes but can also be used for solution polymerization processes. By increasing the molecular weight of the cycloolefin monomers, polymers having higher glass transition temperatures are obtained.

19 Claims, No Drawings

METHOD FOR PREPARING CYCLOOLEFIN COPOLYMERS WITH IMPROVED HEAT STABILITY

RELATED APPLICATIONS

This application is related to copending application Ser. No. 103270, filed Oct. 1, 1987, and now abandoned.

FIELD OF THE INVENTION

This invention is directed to copolymers of cycloolefin monomers. More particularly, this invention is directed to a method for producing a feedstock of cycloolefin monomers containing resinous cycloolefin monomers for polymerization which provides copolymers with high heat stability.

BACKGROUND OF THE INVENTION

Cyclooleffin monomers which contain a norbornene group are known to polymerize by ring-opening polymerization and addition polymerization. Polymers obtained by a ring-opening polymerization of cycloolerfins that contain the norbornene group are well known. For example, U.S. Pat. Nos. 4,136, 249; 4,178,424; 4,136,248, assigned to the same assignee of the present invention, describe such polymers, and each is incorporated herein by reference for the description of polymers therein.

Ring-opening polymerization of cycloolefins yields unsaturated linear polymers which are of particular interest in that they are known to be reactive (sulfur-vulcanizable) and they are known to exhibit attractive property profiles for many polymer applications, such as, for example, as automotive parts, particularly decorative trim.

Dicyclopentadiene and cyclopentene are common cycloolefin monomers used to prepare ring-opening polymerized polymers in that these cycloolefin monomers are readily available as by-products in ethylene production. Recent U.S. Patents directed to cyclopentene adn dicyclopentadiene polymers include U.S. Pat. Nos. 3,778,420; 3,781,257; 3,790,545; 3,853,830 and 4,002,815. Other well known cycloolefin monomers include bicyclic norbornene (bicyclo[2.2.1]-hept-2-ene) and substituted bicyclic norbornenes, which are produced by Diels-Alder reaction of cyclopentadiene with selected olefins.

Dicyclopentadiene monomers produce ring-opened polymerized polymers with excellent glass transition temperatures of about 160° C. However, there is a continuing effort to obtain ring-opened polymerized polymers with higher values for glass transition temperature to expand the use of such polymers to applications requiring higher heat resistance. Methods and compositions which provide ring-opened polymerized polymers with higher Tg values than dicyclopentadiene polymers are known. Typically, cycloolefin monomers having a greater number of ring structures combined with a molecular weight greater than dicyclopentadiene provide polymers and copolymers with higher Tg values when substituting for dicyclopentadiene. For example, tetracyclododecene and substituted tetracyclododecenes are well known cycloolefin monomers made by Diels-Alder reaction of cyclopentadiene with bicyclic norbornene or the appropriate substituted bicyclic norbornene. These tetracyclododecenes have higher molecular weight and more ring structures than dicyclopentadiene. Tetracyclododecene homopolymers have higher Tg values than homopolymers of dicyclopentadiene and where used in copolymers with bicyclic norbornenes, they provide a greater enhancement of Tg values than dicyclopentadiene.

However, cycloolefin monomers having a higher molecular weight and a greater number of ring structures than dicyclopentadiene are not easily obtained. Such "high molecular weight" cycloolefins must be synthesized in a process separate from the polymerization procedure, typically from dicyclopentadiene and/or cyclopentadiene starting materials. The need for a separate synthesis is disadvantageous in that such a process adds significantly to the cost of the final product and may introduce undesirable impurities to the polymerization process. Impurities often reduce the degree of conversion of the cycloolefin monomers in forming the ring-opened polymerized product and high levels of unconverted monomer within the final polymerized product can render the material unsuitable for molding rigid articles. To maintain high levels of conversion, the synthesized "high molecular weight" cycloolefin may need to be purified, which also adds to the cost of the final product.

It is desirable to obtain a more convenient source of cycloolefin monomers with higher molecular weights and more ring structures than dicyclopentadiene. In addition, it is desirable to provide a convenient method for utilizing these "high molecular weight" cycloolefin monomers within a polymerization scheme. It would be advantageous for such a method to be sufficiently flexible so as to provide "high molecular weight" cycloolefin monomers suitable for use in ring-opening polymerization reactions and addition polymerization reactions utilizing either solution or bulk polymerization techniques.

SUMMARY OF THE INVENTION

This invention provides a method for increasing the molecular weight and the number of ring structures of one or more cycloolefin monomers within a polymerization feedstock. This is accomplished by providing a volume of one or more cycloolefin monomers of suitable purity for polymerization wherein the cycloolefin monomers have at least one norbornene group. This volume of one or more cycloolefin monomers is heated to a temperature sufficiently high to dissociate a portion of the cycloolefin monomers therein and react the dissociation products with components of said volume. The volume of cycloolefin monomers is maintained free of both polymerization catalyst and co-catalyst components during heating.

Another embodiment of this invention is a ring-opening polymerization process wherein a volume of one or more cycloolefin monomers of suitable purity is heated to increase the monomer molecular weight and the number of monomers with a high ring content. This heated volume of monomers is then utilized to obtain ring-opened polymerized polymers having high glass transition temperature values. These cycloolefin monomers can be polymerized in solution or in bulk.

Also provided by this invention are compositions comprising ring-opened polymerized polymers derived from "high molecular weight" cycloolefin monomers produced by the method of this invention.

"High molecular weight" cycloolefin monomers as defined herein are those that have both higher molecular weight and more ring structures than dicyclopentadiene.

DETAILED DESCRIPTION OF THE PREFERRED EMBODIMENTS

The invention herein is based on the discovery that a volume of cycloolefin monomers of suitable purity for polymerization can be heated to cause dissociation without inhibiting the performance of said volume of cycloolefin monomers within a polymerization reaction. The dissociation of the cycloolefin monomers is not deleterious to the subsequent polymerization reaction in that the dissociation products react with components of said volume of cycloolefin monomers, which generally includes the one or more cycloolefin monomers and optionally nonconjugated alpha-olefins, or monocyclic olefins.

The dissociation products will preferentially react with the norbornene group of a cycloolefin monomer, thereby increasing the molecular weight of the cycloolefin monomer. The quantity of dissociation products within the volume of cycloolefin monomers remains low because of their reactivity and these small quantities of dissociation products do not significantly affect the performance, i.e., the degree of conversion, of the cycloolefin monomers in ring-opening polymerization procedures.

The one or more cycloolefin monomers which can be increased in molecular weight by the process described herein, are characterized by the presence of at least one norbornene group represented by Formula I below, which can be substituted or unsubstituted.

I

Pursuant to this definition, suitable norbornene-type monomers include substituted norbornenes and unsubstituted norbornene, dicyclopentadiene, dihydrodicyclopentadiene, cyclopentadiene trimers, tetracyclododecene, and substituted tetracyclododecenes. Common cycloolefin monomers conform to Formulas II and IIIa below:

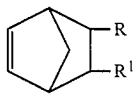

II

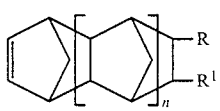

IIIa

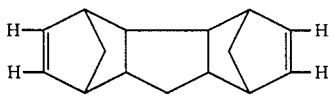

IIIb wherein n=1 and R and $R^1$ are independently selected from hydrogen, halogen, $C_1$-$C_{12}$ alkyl groups, $C_2$-$C_{12}$ alkylene groups, $C_6$-$C_{12}$ cycloalkyl groups, $C_6$-$C_{12}$ cycloalkylene groups and $C_6$-$C_{12}$ aryl groups or R and $R^1$ together form saturated or unsaturated cyclic groups of from 4 to 12 carbon atoms with the two ring carbon atoms connected thereto, said ring carbon atoms forming part of and contributing to the 4 to 12 carbon atoms in the cyclic group. Less common cycloolefin monomers of Formula IIIa with n>1 and those of Formula IIIb are also suitable. For example, cyclopentadiene tetramers (n=2), cyclopentadiene pentamers (n=3) and hexacycloheptadecene (n=2) are suitable monomers for use in this invention. Examples of common cycloolefin monomers conforming to Formulas II and IIIa include 2-norbornene, aslo named bicyclo[2.2.1]-2-heptene
5-methyl-2-norbornene,
5,6-dimethyl-2-norbornene,
5-ethyl-2-norbornene,
5-butyl-2-norbornene,
5-hexyl-2-norbornene,
5-octyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-α-naphthyl-2-norbornene,
5-cyclohexyl-2-norbornene,
5,5-dimethyl-2-norbornene,
dicyclopentadiene (or cyclopentadiene dimer),
dihydrodicyclopentadiene (or cyclopentene cyclopentadiene codimer),
methyl-cyclopentadiene dimer,
ethyl-cyclopentadiene dimer,
tetracyclododecene, also named 1,2,3,4,4a,5,8,8a-octahydro- 1,4:5,8-dimethyanonaphthalene
9-methyl-tetracyclo[6.2.1.1$^{3,6}$.0$^{2,7}$]-4-dodecene, also named 1,2,3,4,4a,5,8,8a-octahydro-2-methyl-4,4:5,8-dimethanonaphthalene
9-ethyl-tetracyclo[6.2.1.1$^{3,6}$.0$^{2,7}$]-4-dodecene,
9-propyl-tetracyclo]6.2.1.1$^{3,6}$.0$^{2,7}$]-4-dodecene,
9-hexyl-tetracyclo[6.2.1.1$^{3,6}$.0$^{2,7}$]-4-dodecene,
9-decyl-tetracyclo[6.2.1.1$^{3,6}$.0$^{2,7}$]-4-dodecene,
9,10-dimethyl-tetracyclo[6.2.1.1$^{3,6}$.0$^{2,7}$]-4-dodecene,
9-ethyl,10-methyl-tetracyclo[6.2.1.1$^{3,6}$.0$^{2,7}$]-4-dodecene,
9-cyclohexyl-tetracyclo[6.2.1.1$^{3,6}$.0$^{2,7}$]-4-dodecene,
9-chloro-tetracyclo[6.2.1.1$^{3,6}$.0$^{2,7}$]-4-dodecene,
9-bromo-tetracyclo[6.2.1.1$^{3,6}$.0$^{2,7}$]-4-dodecene,
cyclopentadiene-trimer,
methyl-cyclopentadiene-trimer,
and the like.

The most preferred cycloolefin monomer is dicyclopentadiene because it is readily available.

The volume of cycloolefin monomers is of suitable purity for polymerization. Impurities hinder poymerization and reduce the degree of conversion of monomer to polymer product. The impurities present within the cycloolefin monomers are preferably sufficiently low to permit at least about 90% conversion of the cycloolefin monomers to polymer. Obtaining a degree of conversion higher than 90% is more desirable and appraching 100% conversion of cycloolefin monomer is most preferred. Purification of the cycloolefin monomers can be achieved by conventional distillation to remove low boiling components. Preferably, the volume of cycloolefin monomer is more than 90% pure and most preferably at least 99% pure.

The feedstock for the process according to this invention may contain constituents other than the cycloolefin monomers. For example, non-conjugated acyclic olefins, monocyclic olefins and monocyclic diolefins may be incorporated in the cycloolefin mixture subjected to heating and subsequently to solution or bulk polymerization. Of the non-conjugated acyclic olefins, those having at least 1 hydrogen on each double bonded carbon atom and containing 2 to 12 carbon atoms are suitable. Preferably, these non-conjugated acyclic olefins contain 2 to 8 carbon atoms and have the double bond in the terminal position. It is known that these non-conjugated acyclic olefins act in solution polymerization as molecular weight modifiers which aid in the processability of the copolymers they become a part of. By easily processable, it is meant millable or otherwise readily thermoplastic upon appropriate heating. Examples of suitable non-conjugated acyclic olefins include 1-butene and 3-methyl-1-butnene, 4-methyl-2-pentene, 5-ethyl-3-octene, 2-pentene and the like. Of the non-conjugated diolefins, 1,6-hexadiene is preferred and of the triolefins, 1,4,7-octatriene is preferred. Preferred non-conjugated acyclic olefins include alpha-olefins such as 1-butene and 1-hexene. The non-conjugated acyclic olefins are typically used in a molar ratio of acyclic olefin to cycloolefin of from 0.001:1 to about 0.5:1 and preferably about 0.01:1 to 0.3:1.

Of the monocyclic monoolefins, those which contain 4 to 8 carbon atoms are suitable. Examples include cyclobutene, cyclopentene, cycloheptene, cyclooctene, cyclododecene, cyclodecene and the like. Of the monocyclic diolefins, cyclododecadiene and 1,5-cyclooctadiene are suitable. It is preferable to limit these monocyclic olefins to about 20% by weight of the total cycloolefin monomer present in the polymerization feedstock. In solution polymerization, these monocycloolefins will not reduce the molecular weight of the copolymers obtained from the polymerization feedstock as do the acyclic alpha-olefins upon polymerization.

Other components which may be present in the feedstock are common additives such as modifiers, fillers, impact improvers, flame retardants and the like. The polymerization catalyst and co-catalyst components should preferably not be present within the volume of cycloolefin monomers during the heating and are added after the heating. After heating, the catalyst or co-catalyst component may be present within said volume, but not both, on the condition that neither causes gelling or polymerization. Where desired, two separate volumes may be treated in accordance with the method of this invention with catalyst added to one and co-catalyst to the other, and both volumes admixed to form the complete catalyst/co-catalyst system and initiate polymerization. With no solvent present, this would represent bulk polymerization of a two component system.

Different cataylsts/co-catalysts may be added after heating, depending on the type of polymerization desired of the feedstock. Where ring-opening polymerization takes place in bulk, the preferred catalysts are distinct from those preferred for solution ring-opening polymerization. Where solution polymerization is intended, the catalyst and co-catalyst need not be present in the volume of cycloolefin monomer since these monomers will be solubilized in a suitable solvent before reaction, permitting the catalyst/co-catalyst to be conveniently added at that time.

For ring-opening solution polymerization, the catalyst preferably comprises molybdenum or tungsten salts and the co-catalyst preferably comprises dialkylaluminum halides, alkulaluminum dihalides, alkylalkoxy halide or a mixture of trialkylaluminum with an iodine source. Either of these components may be present in the volume of cycloolefin monomer without inhibiting the objectives of the present invention.

Examples of useful molybdenum and tungsten salts include the halides such as chlorides, bromides, iodides, and fluorides. Specific examples of such halides include molybdenum pentachloride, molybdenum hexachloride, molybdenum pentabromide, molybdenum hexabromide, molybdenum pentaiodide, molybdenum hexafluoride, tungsten hexachloride, tungsten hexafluoride and the like. Other representative salts include those of acetylacetonates, sulfates, phosphates, nitrates, and the like. Mixtures of salts can also be used. For polymerization results, the more preferred salts are the molybdenum halides, especially molybdenum pentahalides such as $MoCl_5$.

Specific examples of co-catalysts for ring-opening solution polymerization include alkyl-aluminum halides such as diethylaluminum iodide, ethylaluminum diiodide, propylaluminum diiodide and ethylpropylaluminum iodide and a mixture of triethylaluminum and elemental iodine.

For ring-opening solution polymerization, the molybdenum or tungsten salt is generally employed at a level from about 0.01 to about 50 millimoles per mole of total monomer, preferably from about 0.5 to about 10 millimoles per mole of total monomer and, the organoaluminum compounds described above are generally used in a molar ratio of organoaluminum compound to molybdenum and/or tungsten salt(s) from about 10/1 to about 1/3, preferably from about 5/1 to about 3/1. Both catalyst and co-catalyst for solution polymerization are normally added after the heating and at the time of polymerization.

Where bulk polymerization of the volume of cycloolefin monomer is intended, it may be most convenient for the catalyst or co-catalyst to be added after treatment of a volume of cycloolefin monomers by the process of this invention. It is recognized however, that these compounds may be present during treatment by the process if they do not decompose and do not cause isomerization, polymerization or other undesired reaction.

Examples of bulk polymerization catalysts include, the organoammonium molybdates and tungstates represented by the formulas below:

$$[R^2{}_4N]_{(2y-6x)}M_xO_y \qquad \text{IV}$$

and $$[R^3{}_3NH]_{(2y-6x)}M_xO_y \qquad \text{V}$$

wherein O represents oxygen; M represents either molybdenum or tungsten; x and y represent the number of tungsten/molybdenum and oxygen atoms in the molecule based on a valence of +6 for molybdenum, +6 for tungsten and −2 for oxygen; and the $R^2$ and $R^3$ radicals can be the same or different and are selected from hydrogen, alkyl and alkylene groups each containing from 1 to 20 carbon atoms and cycloaliphatic groups each containing from 5 to 16 carbon atoms. All of the $R^2$ and $R^3$ radicals cannot be hydrogens nor be small in number of carbon atoms in that such a condition will render the molecule essentially insoluble in hydrocarbons and most organic solvents.

A more detailed description of these organoammonium molybdates and tungstates appears in U.S. Pat. No. 4,426,502, assigned to the same assignee as the present invention which is incorporated herein by reference. Specific examples of suitable organoammonium molybdates and tungstates include tridodecylammonium molybdates and tungstates, methyl tricaprylammonium molybdates and tungstates, tri(tridecyl)-ammonium molybdates and tungstates and trioctyl ammonium molybdates and tungstates.

The presence of these bulk polymerization catalysts or co-catalysts within the volume of cycloolefin monomer should not inhibit the objectives of the present invention in providing high molecular weight cycloolefin monomers if they do not decompose and do not cause isomerization polymerization or other undesired reactions. The quantity of catalyst or co-catalyst present is generally dictated by the needs of the subsequent bulk polymerization reaction and the resulting products desired.

Examples of co-catalysts used in bulk polymerizations are aryloxy alkylaluminum halides and alkoxyalkylaluminum halides of the formula $(R^4O)_a R^5_b AlX_c$, where $R^4$ is an alkyl or phenyl radical containing about 1 to 18 carbon atoms, preferably 2 to 4; $R^5$ is an alkyl radical containing 1 to 18 carbon atoms, preferably 2 to 4; X is a halogen selected from chlorine, iodine, bromine and florine, preferablyh chlorine and iodine; "a" is the number of equivalents of the alkoxy or aryloxy moiety and can vary from about $\frac{1}{2}$ to about $2\frac{1}{2}$, preferably from about 1 to about $1\frac{3}{4}$; "b" is the number of equivalents of the alkyl group and can vary from a minimum of about $\frac{1}{4}$ to a maximum of about 2, preferably from about $\frac{1}{2}$ to about 1; and "c" is the number of equivalents of halogen and can vary from a minimum of about $\frac{1}{2}$ to a maximum of about 2, preferably from about $\frac{3}{4}$ to about $1\frac{1}{4}$. The sum of a, b, and c must equal 3.0.

For bulk polymerization, the organoammonium molybdate or tungstate or a mixture thereof, is generally employed at a level of about 0.01 to 50 milimoles molybdenum or tungsten per mole of total cycloolefin monomer, preferably 0.1 to 10 millimoles. The molar ratio of alkylaluminum halide to the organo ammonium molydate and/or tungstate is not critical and can be in the range of about 200:1 and above to about 1:10 and is preferably from 10:1 to 2:1 of aluminum to molydenum or tungsten.

Conventional additives may also be included in the volume of cycloolefin monomers so long as they do not inhibit the objectives of the present invention in providing high molecular weight cycloolefin monomers. These conventional additives include antioxidants such as Ethyl 330, a hindered phenol antioxidant; impact modifiers such as the Kraton series provided by Shell Chemical Company, which are generally styrene-butadiene-styrene block of copolymers; flame retardants such as antimony oxide and organohalides (decabromodiphenylether); fillers such as glass or carbon fibers; pigments such as titanium dioxide; etc. The amount of each additive present in said volume is preferably that which provides the desired additive effect to the finished polymerized polymer.

Upon obtaining a volume of one or more cycloolefin monomers of suitable purity for use as a polymerization feedstock, this volume of cycloolefin monomers is heated to a temperature sufficiently high to dissociate a portion of these monomers and react the dissociation products with components therein. It is believed dissociation of the cycloolefin monomers yields cyclopentadiene units which will react with the norbornene structures on the remaining cycloolefin monomers. The dissociation products will also react with other components of the volume of cycloolefin monomers. This may include monocyclic olefins, acyclic olefins, but to a much lesser degree, if at all, with the conventional additives, i.e. flame retardants, impact modifiers, etc. which may be within the volume of cycloolefin monomers that provide a polymerization feedstock.

Temperatures in the range of 130° C. to 200° C. are preferred for use with a volume of dicyclopentadiene monomer. Most preferably, the temperature is maintained within the range of about 140° C. to 175° C. for dicyclopentadiene monomer.

The volume of cycloolefin monomers is maintained at an elevated temperature for at least about 0.25 hours and preferably from about 1 to 24 hours. The extent of dissociation and reaction varies with the time and temperature utilized. The higher temperatures provide rapid dissociation, permitting shorter heating periods for increasing the fraction of the higher molecular weight cycloolefin monomers in the feedstock.

The extent of dissociation can be controlled by controlling the temperature or duration of exposure to the high temperatures. In the extreme case, as much as 95% of the original cycloolefin monomer can be dissociated and the resulting products reacted to form new species. Dissociating and reacting about 5 to 50% by weight of the original cycloolefin monomer can be accomplished quite easily within a relatively short period of time at temperature values within the preferred range.

Where dicyclopentadiene is utilized as the cycloolefin monomer, the cycloolefin products of a higher molecular weight predominantly include, in decreasing concentration, tricyclopentadiene, tetracyclopentadiene, pentacyclopentadiene, etc. Where dicyclopentadiene is the starting material and the heating period is less than 12 hours, resinous cycloolefin monomers with a degree of polymerization beyond pentacyclopentadiene are expected, but difficult to detect due to low concentrations.

Ethylidene norbornene is a common comonomer used in polymerization reactions with dicyclopentadiene in that it helps maintain dicyclopentadiene liquid at room temperature. Where present, it will dissociate and/or react with dissociated products to yield higher molecular weight cycloolefin monomers. Typical products from ethylidene norbornene include ethylidene tetraclododecene, ethylidene hexacycloheptadecene, etc. Homologs of ethylidene norbornene beyond ethylidene hexacycloheptadecene are difficult to detect because small quantities are present where the heating period is less than 12 hours.

A common alpha olefin present in the volume of cycloolefin monomer is styrene, which produces phenyl-norbornene, phenyl-tetractclododecene, phenyl-hexacycloheptadecene, etc. in polymerization feedstocks which contain dicyclopentadiene.

Not all products will be of a higher molecular weight than the original cycloolefin monomer. Where monocyclic olefins and acyclic alpha-olefins are present, new cycloolefin monomer species will be generated by the reaction of cyclopentadiene. These monomers may eventually achieve a higher molecular weight than the starting material if the reaction with cyclopentadiene is permitted to continue. For example, if 1,4 butadiene is present in the polymerization feedstock with dicyclopentadiene, vinyl-norbornene will be produced, which has a lower molecular weight than dicyclopentadiene. This vinyl-norbornene will continue to react to generate vinyl-tetracyclododecene, vinyl-hexacycloheptadecene, etc., which have higher molecular weights than dicyclopentadiene.

Feedstocks obtained from the process of the present invention contain cycloolefin monomers of a molecular weight higher than the original starting materials. Such a feedstock will provide polymers having higher heat distortion temperatures and higher glass transition temperatures. The feedstocks provided by the present invention can be used for ring-opening polymerizations in either solution or bulk processes. Typical bulk polymerizations include reaction injection molding (RIM), resin transfer molding (RTM) and liquid injection molding (LIM) techniques.

Also provided by this invention are methods for producing ring-opened polymerized products. These methods incorporate the steps of providing a volume of one or more cycloolefin monomers of suitable purity for polymerization and heating this volume of cycloolefin monomers to dissociate a portion thereof and react the dissociation products to yield higher molecular weight cycloolefin monomers. It is important that heating take place in the absence of the polymerization catalyst system to prevent early polymer formation.

Included within the polymerization methods provide by this invention are bulk polymerization processes wherein subsequent to heating at least one volume of cycloolefin monomer, a reactive liquid mixture is formed from one or more volumes of cycloolefin monomer by adding a bulk polymerization catalyst and a bulk polymerization co-catalyst after heating. Alternatively, two separate liquid mixtures can be formed from the one or more heated volumes of cycloolefin monomer, one containing catalyst and the other containing co-catalyst. The heated volumes of cycloolefin monomer are preferably cooled prior to adding catalyst and/or co-catalyst.

Upon formation of the reactive liquid mixture, it is conveyed into a mold maintained at a temperature sufficiently high to initiate ring-opening polymerization. Where the catalyst and co-catalyst are present in separate liquid mixtures, these separate liquid mixtures are mixed and conveyed onto a mold. Mixing of these separate liquid mixtures may be accomplished well in advancce or it may be accomplished simultaneously with conveying the separate liquid mixtures to the mold. The heated volume of cycloolefins should not be at the temperature necessary to dissociate the cycloolefin monomers when adding catalyst and/or co-catalyst to form the liquid mixtures or the reactive liquid mixture.

Suitable catalysts are the ammonium molybdates and tungstates previously described and suitable co-catalysts are the alkylaluminum halides described as suitable for bulk polymerization. Suitable mold temperatures fall in the range of 25° C. to 150° C. At the conclusion of the bulk polymerization, the polymers obtained are in the shape of the mold in which reaction occurred. These products are essentially ready for use in the application for which they were intended. The product may be in the shape of an instrument case or car fender or one of many industrial or automotive uses.

Included within the polymerization processes of the present invention, is a method for producing ring-opening polymerized products by solution techniques. These methods incorporate the preparation and heating steps described above for the method of increasing cycloolefin monomer molecular weight. Upon obtaining the desired increase in molecular weight, a solution is formed comprising the heated volume of cycloolefin monomers, a ring-opening polymerization catalyst and one or more organic solvents. As indicated with respect to the bulk polymerization processes, the heated volume of cycloolefin monomers should not be at the temperature necessary to dissociate and react the cycloolefin monomers within to form the monomer solution when the catalyst system is added. The volume of cycloolefin monomers may be cooled prior to the addition of the catalyst and co-catalyst and solvent. The ring-opening polymerization catalysts suitable for solution procedures include the molybdenum and tungsten salts described above and the alkoxyalkylaluminum halides, alkylaluminum halides and arylaluminum halides described above are suitable co-catalysts.

Suitable solvents for the solution polymerization include aliphatic and cycloaliphatic hydrocarbon solvents containing 4 to 10 carbon atoms such as cyclohexane, cycloctane and the like; aromatic hydrocarbon solvents containing 6 to 14 carbon atoms which are liquid or easily liquified such as benzene, toluene, xylene and the like; and substituted hydrocarbons wherein the substituents are inert such as dichloromethane, chloroform, chlorobenzene, dichlorobenzene and the like.

Incorporating catalyst into the solution polymerization feedstock may be aided by the use of a solvent. A preferred solvent for molybdenum and tungsten salts comprises at least one alkyl ester of a saturated carboxylic or dicarboxylic acid. Suitable alkyl esters of saturated carboxylic or dicarboxylic acids typically contain from 2 to 5 carbon atoms and 0 or 1 bromine or chloine atoms, exemplified by a methyl formate, ethyl formate, methyl chloroformate, ethyl chloroformate, butyl chloroformate, butyl chloroformate, methyl acetate, ethyl acetae, isopropyl acetate, n-propyl acetate, methyl bromoacetate, ethyl bromoacetate, ethyl bromoacetate, ethyl propionate, methyl propionate, and the like. Excellent results are obtained using ethyl acetate. It should be noted that cosolvents may be used in combination with the ester solvents described above.

Once the reaction solution is obtained, this solution is heated to a temperature sufficiently high to generate ring-opening polymerization. Generallay, ring-opening polymerization temperatures fall within the range of about 10° C. to about 100° C., although the reaction generally proceeds especially well at about 25° C. to 45° C. This polymerization may be shortstopped by the addition of alcohols, such as ethanol, amines, such as diethyl amine, alkanoamines or carboxylic acids, such as acetic acid, and the like.

At the conclusion of the solution polymerization, the polymers obtained may be isolated by any method known to the art, such as, by coagulation and precipitation using an alcohol such as methanol, ethanol, isopropanol or the like, or by steam or hot water stripping. The polymer is recovered and may be washed further with water or an alcohol and then dried.

Mixing of the catalyst components with the cycloolefin monomers is preferably carried out in an inert atmosphere such as nitrogen and in the substantial absence of air or water. The polymerization may be performed as a batch or continuous operation and is conducted under sufficient pressure to keep the monomers and solvents in a liquid state with the pressure required depending upon the reaction temperature. The particular ester solvent system selected must be liquid under the reaction conditions used.

Polymerization activators may be used in either the solution or bulk polymerization reactions. Examples of activators include water, methanol, ethanol, isopropyl alcohol, benzyl alcohol, phenol, methyl mercaptan, 2-chloroethanol, 1,3-dichloropropanol, p-bromophenol, epichlorohydrin, ethylene oxide cyclopentene-2-hydroperoxide, cumyl-hydroperoxide, tertiary butyl peroxide, benzoyl peroxide, and air or oxygen. Excellent activation is obtained using air or peroxide or hydroperoxide as the activator, especially by using the organic peroxides such as benzoyl peroxide. This activator is preferably employed in a quantity of less than about 3 moles per mole of organoaluminum compound and most preferably less than 1 mole per mole of organoaluminum compound.

Also included in this invention are compositions comprising the copolymers produced by the bulk polymerization and solution polymerization processes of this invention. Of particular interest are those ring-opened polymerized polymers which contain a variety of cycloolefin monomers. For example, polymers containing about 75% by weight dicyclopentadiene, about 20% by weight cyclopentadiene trimers and about 2% other "higher molecular weight" monomers are of particular interest in that they exhibit glass transition temperatures generally above 180° C. This is significantly higher than the glass transition temperature of dicyclopentadiene homopolymers (160° C.). The polymers of this invention are high molecular weight products typically havingk, when soluble, dilute solution viscosities (DSV) ranging from about 0.2 to about 10, more generally from about 0.3 to about 2. By dilute solution viscosity is meant the value obtained using the following formula:

$$DSV = ln(t/t_0)/\underline{c}$$

where $t_0$ is toluene flow time and $\underline{t}$ is flow time of a polymer solution in toluene (both measured at 25° C. in toluene using an Oswald-Fensky viscometer) and $\underline{c}$ is the concentration of the polymer solution (measured in grams of polymer per deciliter of toluene at 25° C.). The DSV is regarded as a measure of molecular weight and is reported in units of deciliters per gram.

The copolymer products produced by the solution polymerization processes of this invention can be blended with impact modifiers, antioxidants, flame retardants, pigments and the like. Those obtained by bulk polymerization are generally in final form and any additives thereto must be introduced prior to polymerization.

The following examples are provide to better illustrate the invention. It should be recognized that this invention includes other embodiments which are not shown with the particularity of those below.

The Effect of Heating Cycloolefin Mononers on Glass Transition Temperature and Impact Strength

EXAMPLES 1–9 AND CONTROLS A–F

These examples serve to compare the Tg values and Izod impact strength of polymers obtained from cycloolefins treated in accordance with the process of the invention which contain impact modifier during the heating step. For Examples 1–9, volumes of dicyclopentadiene both with and without ethylidenenorbornene in varying amounts were heated and subsequently polymerized. Controls A–F are provided to compare Tg values and Izod impact strength to non-heat-treated volumes of cycloolefins. In selected examples, impact modifiers were incorporated in the dicyclopentadiene prior to heating. Details as to the initial monomer composition for Examples 1–9 and Controls A–F are shown in Table 1. The impact properties and glass transition temperature obtained from the polymers produced upon bulk polymerization are also provided in Table 1.

Control A

About 82.1 grams of 99% purity dicyclopentadiene were charged to a 7 oz. beverage bottle, previously dried for at least 1 hour at 105° C. and cooled to room temperature under nitrogen purge. Two grams of Ethyl-702 antioxidant were added, then 2 ml of a 1M solution of n-Propanol in a solvent of dicyclopentadiene (DCPD)/5-ethylidene-2-norbornene (ENB) at a 95:5 weight ratio, then 4 ml of a 0.5M solution of diethylaluminum chloride in DCPD/ENB at a 95:5 weight ratio, and then 4 ml of a 0.25M solution of silicon tetrachloride in DCPD/ENB at a 95:5 weight ratio. The bottle head space was evacuated at 10 mm Hg until the formation of gas bubbles ceased. About 5 ml of a 0.012.5M solution of an amine molybdate having the molecular formula $[(C_{12}H_{25})_3NH]_4Mo_8O_{26}$ in DCPD/ENB at a 95:5 weight rato were added to the bottle and dispersed rapidly. The bottle was inverted and using nitrogen pressure, the liquid contents were transferred into a mold preheated to about 60° C. The temperature of the exotherm that ensued within 1.5 minutes was about 160° C. After about 5 minutes, the mold was opened and the molded product removed. The degree of conversion was about 97.4%. The degree of conversion for polymerization was determined by thermal gravimetric analysis (TGA) loss of weight at 400° C. Glass transition temperatures were measured by differential scanning calorimetry (DSC) and heat distortion temperature was measured at about 264 psi load. Flexural modulus was measured with ⅛th inch thick samples. Details as to other measurements of physical properties are given in the respective examples.

The glass transition was about 160° C. The heat distortion temperature was about 111° C. at a 264 psi load, the flexural modulus of a ⅛-inch thick sample was 277,000 psi, and the amount of swell after immersion in toluene at 100° C. for 2 hours was 109%. The Izod impact strength at room temperature was about 1.59 ft-lb/inch.

Example 1

About four gallons of dicyclopentadiene at 99% purity were charged in a 5-gallon autoclave reactor provided with a 100 psi steam heated jacket. The reaction contents were nitrogen purged, heated to about 150° C. for about 6 hours and cooled down to room temperature. A gas chromatograph (GC) analysis of the contents showed 76.4% dicyclopentadiene and 22.8% by weight of higher molecular weight Diels Alder adducts of dicyclopentadiene with one or more cyclopentadiene molecules (20.8% tricyclopentadiene and 2.0% tetracyclopentadiene). About 81.2 grams of this preheated mixture was bulk polymerized in accordance with the procedure described above but with no antioxidant and instead, 1.8 ml of the n-propanol solution, 4 ml of the diethylaluminum chloride solution and 4 ml of the silicon tetrachloride solution were used. After evacuation until gas bubble formation ceased, about 5 ml of the molybdate solution were added, dispersed, and the mixture injected in a mold preheated to about 60° C. The reaction exotherm registered 167° C.

The conversion was about 97.6%. The Izod impact strength (264 psi load) at room temperature was about 1.57, the glass transition temperature was about 182° C. and the heat distortion temperature was about 140° C. These results are shown again in Table 1.

Example 2

Example 1 was repeated except the volume of dicyclopentadiene was heated for only 4 hours at 150° C. The results are shown in Table 1. Examples 1 and 2 show how the Tg's and HDT's of these new copolymer compositions are greater than for the Control A.

Control B

Control A was repeated except that 2.5% weitght-parts of a styrene-ethylene-butylene-styrene rubber, Kraton G-1652, was dissolved in the dicyclopentadiene overnight at room temperature and the mixture polymerized. The results are shown in Table 1.

Example 3

Example 1 was repeated with the same modification to the bulk polymerization procedure except about 5.25 parts by weight of a styrene-butadiene-styrene rubber (Kraton D-1101) was added to dicyclopentadiene before preheating for about 5 hours at 160° C. The results are shown in Table 1. The heating process not only improves the glass transition temperature but impact strength is decreased due to reaction of the impact modifier during the heating step.

Controls C and D

Control A was repeated except 85/15 and 90/10 weight ratios of dicyclopentadiene and 5-ethylidene-2-norbornene were used in the bulk polymerization. The results are shown in Table 1.

EFFECT OF HEATING CYCLOOLEFIN ON COMPOSITION

Example 4

This example also illustrates the increase in molecular weight obtained for mixtures of cycloolefin monomers when heated sufficiently high to dissociate. A mixture of 180 grams dicyclopentadiene, with 18 grams ethylidene norbornene was heated in an autoclave to 190° C. for about 30 minutes. Analysis of the products by gas chromatography-mass spectrometry (GCMS) indicates the feedstock had the following composition: dicyclopentadiene=73% by weight, ethylidene norbornene =5.4% by weight, ethylidene tetracyclododecene=3% by weight, cyclopentadiene trimer=6% by weight, ethylidene hexacycloheptadecene=0.25% by weight and cyclopentadiene tetramer=1.5% by weight, all based on the weight of the total feedstock composition. The feedstock monomer showed a substantial increase in molecular weight. This formulation was used to produce plaques by a bulk polymerization technique as shown in Example 1. The plaques obtained were tested for glass transition temperature, which showed a value of 177° C. on the third run, and Izod impact strength, which showed a value of 0.94 ft-lbs/in.

Example 5

Example 1 was repeated except a 100/10 weight ratio of dicyclopentadiene and 5-ethylidene-2-norbornene was preheated in an autoclave for about 60 minutes at 190° C. After cooling to room temperature the contents were analyzed by gs chromatography and showed 64.3% dicyclopentadiene and 4.6% 5-ethylidene-2-norbornene, the remaining 30% being higher Diels Alder adducts of these monomers with cyclopentadiene. Bulk polymerization was performed as described in Example 1. Analysis of the physical properties for the finished parts gave the results shown in Table 1. The raising of the glass transition temperature is significant compared to the non-heated controls.

Controls E and F

Control A was repeated except 95/5 and 90/10 weight ratios of dicyclopentadiene to 5-ethylidene-2-norbornene were used, respectively and Kraton G-1652 was added to obtain a concentration of 2.5 parts of rubber. The results are given in Table 1.

Examples 6 and 7

Example 1 was repeated twice but slightly modified to give a mixture of dicyclopentadiene and 5-ethylidene-2-norbornene at a 90/10 weight ratio but containing also 5.75 parts by weight of Kraton D-1101 for Example 6 and 5.5 parts by weight Solprene-1205 for Example 7. Solprene SBR-1205 is a styrene-butadiene rubber copolymer. The mixtures were preheated for about 1 hour at about 190° C. The bulk polymerizations were carried out as described in Example 1 and the results are given in Table 1. Higher glass transition temperatures and lower impact strengths were obtained for the products produced from the heated monomer mixtures.

Example 8

Example 6 was repeated except about 5.6 parts by weight of K-resin, a butadiene-styrene copolymer from Phillips Chemical Co. was used in place of Kraton D-1101. The results are given in Table 1. Again, higher Tg and lower impact strength products were obtained.

Example 9

Example 3 was repeated except a mixture of about 5.6 parts by weight of Kraton G-1657, a styrene-ethylene-butylene-styrene block copolymer, and 100 parts of dicyclopentadiene were heated in an autoclave for about 5 hours at 160° C. The results are shown in Table 1. Higher Tg for the product was obtained. Higher impact strength was also obtained because the rubber was saturated and had no sites for reaction with the monomers and cyclopentadiene during the heating step.

| Example Number | Initial Composition (wt. p.*) DCPD[a] | ENB[a] | Rubber | Composition After Preheating** (%) DCPD[a] | Tri-CPD[a] | Tetra-CPD[a] | ENB[a] | ETD[a] | EHH[a] | Izod Impact Strength (ft-lb/in) | Glass Transition temperature (°C.) | Heat Distortion temperature (°C.) | Monomer Conversion (%) |
|---|---|---|---|---|---|---|---|---|---|---|---|---|---|
| Control A | 100 | — | — | 99% | 0.5 | — | — | — | — | 1.59 | 160 | 111 | 97.4 |
| Example 1 | 100 | — | — | 76.4% | 20.8 | 2.0 | — | — | — | 1.57 | 182 | 140 | 97.6 |
| Example 2 | 100 | — | — | 83.5% | 14.7 | 1.0 | — | — | — | 1.7 | 178 | ND | 96.2 |
| Control B | 100 | — | 2.5[b] | 99% | 0.5 | — | — | — | — | 9.8 | 166 | 124 | 98.0 |
| Example 3 | 100 | — | 5.25[c] | 81.5% | 16.5 | 1.4 | — | — | — | 1.0 | 175 | 111 | ND |
| Control C | 85 | 15 | 0 | 85% | — | — | 15 | — | — | 1.1 | 140 | ND | 96.5 |
| Control D | 90 | 10 | 0 | 90% | — | — | 10 | — | — | 1.2 | 153 | ND | 97.0 |
| Example 4 | 100 | 10 | 0 | 73% | 16 | 1.5 | 5.4 | 3 | 0.25 | 0.94 | 177 | ND | 95.9 |
| Example 5 | 100 | 10 | 0 | 64.3% | 22.4 | 3.1 | 4.6 | 4.3 | 0.5 | 1.0 | 191 | 121 | 96.5 |
| Control E | 95 | 5 | 2.5[b] | 95% | — | — | 5 | — | — | 10.5 | 168 | 112 | 98.6 |
| Control F | 90 | 10 | 2.5[b] | 90% | — | — | 10 | — | — | 11.4 | 156 | 109 | 97.7 |
| Example 6 | 100 | 10 | 5.75[c] | 63.5% | 23.5 | 2.5 | 5.75 | 4.4 | 0.3 | 0.85 | 176 | 102 | 97.4 |
| Example 7 | 100 | 10 | 5.5[d] | 67.3% | 20 | 1.85 | 6.0 | 4.0 | 0.28 | 0.75 | 177 | 97 | 96.7 |
| Example 8 | 100 | 10 | 5.6[e] | 68.3% | 19.2 | 2.0 | 6.1 | 4.0 | 0.38 | 1.0 | 180 | 114 | 97.4 |
| Example 9 | 100 | — | 5.6[f] | 81.5% | 16.5 | 1.4 | — | — | — | 3.9 | 176 | 104 | 97.3 |

*wt. p. = parts by weight
**Determined by gas chromatography after rubber coagulation by adding methanol
[a]DCPD = dicyclopentadiene; ENB = 5-ethylidene-2-norbornene; Tri-CPD = cyclopentadiene trimer; Tetra-CPD = cyclopentadiene tetramer; ETD = ethylidene tetracyclododecene; EHH = ethylidene hexacycloheptadecene
[b]Kraton G-1652 styrene-ethylene-butylene-styrene block copolymer (Shell Chemical Co.)
[c]Draton D-1101 — styrene-butadiene-sytrene block copolymer (Shell Chemical Co.)
[d]Solprene SBR-1205 — styrene butadiene rubber copolymer (Phillips Chemical Co.)
[e]K-Resin — butadiene-styrene copolymer (Phillips Chemical Co.)
[f]Kraton G-1657 — similar to G-1652
ND not determined

IMPACT MODIFICATION AFTER HEATING THE CYCLOOLEFINS

Examples 10–12

These examples serve to illustrate the effect of adding impact modifier after heating the cycloolefin monomer mixture. For Examples 10–12 the general procedure for Example 1 was followed, and in each example, a volume of dicyclopentadiene was heated to a temperature of about 150° C. For Example 10, the dicyclopentadiene was heated for about two hours. For Example 11, the heating period was four hours and for Example 12, the heating period was six hours. The volumes of cycloolefin monomers were analyzed by gas chromatography for the extent of dissociation and the results shown in Table 2. For each of these examples, Kraton D-1101 impact modifier was added in a quantity of about 5% by weight based on the weight of total cycloolefin monomer after heating the volume of cycloolefin monomer and cooling to room temperature. The heated monomer mixtures were subjected to a bulk polymerization process in accordance with the procedure described in Example 1. The molded parts were tested for Izod impact strength, HDT and Tg, and the values obtained appear in Table 2. The data for Example 1 is provided for comparison purposes and shows the effect of not adding impact modifier. Excellent Tg's were obtained for the impact modified products, all greater than the comparison example, Example 1. Higher impact strengths can be realized by adding the modifier after the heating period if higher impact strength is needed for the product.

Example 13

Example 1 was repeated except a mixture of dicyclopentadiene and 5-ethylidene-2-norbornene at a weight ratio of 90/10 was preheated for 30 minutes at 190° C. at which time the composition contained 72.5% by weight dicyclopentadiene and 5.4% by weight 5-ethylidene-2-norbornene, the remaining 21.1% being higher Diels Alder adducts of the above monomers with one or more molecules of cyclopentadiene. About 5% by weight based on the weight of monomer, of Kraton D-1101 was added to the mixture after heating and dissolved at room temperature. This mixture was then transferred to, and polymerized in the mold in accordance with the procedures set forth in Example 1. Izod impact strength for the polymerized product measured at 5.2 ft-lb/inch and a glass transition temperature of 182° C. was obtained. These values are shown in Table 2 to permit comparison with Examples 10–12. ENB which normally would lower the Tg of the product now gives a high Tg product after the heating step is employed. Impact strength can be maintain, if desired, by adding the elastomer after heating.

TABLE 2

| | Effect of Heating Cycloolefin Monomers on Impact Modification of Products | | | | | | | |
|---|---|---|---|---|---|---|---|---|
| Example No. | Initial Monomer Composition | | Compositions After Heating | | Rubber[b] Added After Heating (Wt. P.) | Izod Impact Strength (ft-lbs/in) | HDT (°C.) | Tg (°C.) |
| | DCPD[a] | ENB[d] | DCPD[a] | Other[c] | | | | |
| 10 | 100 | — | 93.1 | 5.9 | 5 | 7.2 | 110 | 173 |
| 11 | 100 | — | 85 | 14.0 | 5 | 4.3 | 118 | 181 |
| 12 | 100 | — | 76.4 | 22.5 | 5 | 2.7 | 117 | 191 |
| 1 | 100 | — | 76.4 | 22.5 | 0 | 1.6 | 140 | 182 |

TABLE 2-continued

Effect of Heating Cycloolefin Monomers on Impact Modification of Products

| Example No. | Initial Monomer Composition DCPD[a] | Initial Monomer Composition ENB[d] | Compositions After Heating DCPD[a] | Compositions After Heating Other[c] | Rubber[b] Added After Heating (Wt. P.) | Izod Impact Strength (ft-lbs/in) | HDT (°C.) | Tg (°C.) |
|---|---|---|---|---|---|---|---|---|
| 13 | 90 | 10 | 72.5 | 26.5 | 5 | 5.2 | ND | 182 |

[a]Dicyclopentadiene
[b]Kraton D-1101, styrene-butadiene-styrene block copolymer
[c]Includes all other monomeric species formed by preheating
[d]5-ethylidene-2-norbornene

IMPACT MODIFICATION BOTH BEFORE AND AFTER HEATING THE CYCLOOLEFINS

Example 14

This example illustrates the effect of adding additional impact modifier to a volume of cycloolefins after heating. For Example 14, a mixture of dicyclopentadiene monomers was mixed with Kraton D-1101 impact modifier in a quantity of about 5% by weight and preheated to a temperature of about 160° C. for about five hours following the procedures of Example 3. Subsequent to preheating, additional Kraton D-1101 impact modifier was added to the mixture (5% by weight) and dissolved overnight. The mixture was polymerized in accordance with the procedures outlines in Example 1. The plaques obtained therefrom were evaluated for Izod impact strength and glass transition temperature. These values appear in Table 3 along with those of Example 3, which is provided for purposes of comparison. Examples 14 and 3 show that adding the impact modifier subsequent to the heating step will lead to a higher impact strength product and that elastomer properties will not be decreased as they are when the elastomer is present during heating and contains unsaturation which can undergo reaction.

TABLE 3

Effect of Adding Additional Rubber to Cycloolefin Monomers after Heating

| Example No. | Initial Monomer Composition DCPD[a] (Wt. P.) | Rubber[b] Present During Heating (Wt. P.) | Rubber[b] Added After Heating (Wt. P.) | Izod Impact Strength (ft-lbs/in) | Glass Transition Temp. (°C.) |
|---|---|---|---|---|---|
| 3 | 100.0 | 5 | 0 | 1.0 | 175 |
| 14 | 100.0 | 5 | 5 | 3.9 | 176 |

[a]Dicyclopentadiene
[b]Kraton D-1101

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A method for increasing the molecular weight and number of ring structures of one or more cycloolefin monomers comprising:
    providing a volume of one or more cycloolefin monomers of sufficient purity to provide a degree of conversion to cycloolefin monomers greater than 95% upon polymerization with a metathesis catalyst system, said cycloolefin monomers having at least one norbornene group and
    heating said volume of one or more cycloolefin monomers to a temperature in the range of 130° C. to 200° C. for a period of at least 0.25 hours to dissociate a portion of said cycloolefin monomers and react the dissociation products with components of said volume of cycloolefin monomers;
    wherein said volume of one or more cycloolefin monomers is maintained substantially free of a polymerization catalyst and co-catalyst system during heating and the heated volume of one or cycloolefin monomers is of sufficient purity to provide a degree of monomer conversion greater than 95% upon polymerization with a methathesis catalyst system, wherein the degree of monomer conversion to polymer is determined by thermal gravimetric analysis of weight loss upon heating a polymerized sample up to about 400° C.

2. A method as in claim 1 wherein the volume of one of the cycloolefin monomers prior to heating comprises dicyclopentadiene.

3. A method as in claim 2 wherein the volume of one or more cycloolefin monomers prior to heating additionally comprises members of the group consisting of norbornene, substituted norbornenes, tetracyclododecene, substituted tetracyclododecenes, cyclopentadiene trimer, cyclopentadiene tetramers, cyclopentadiene pentamers and hexacycloheptadecene.

4. A method as in claim 2 wherein the volume of one or more cycloolefin monomers prior to heating additionally comprises members of the group consisting of alpha-olefins of from 3 to 10 carbon atoms and monocycloolefins of from 5 to 10 carbon atoms.

5. A method as in claim 4 wherein said alpha-olefins are selected from 1-hexene, styrene, vinyl-cyclohexene, isoprene, adn butadiene, and said monocycloolefin is selected from cyclopentene.

6. A method as in claim 2 wherein the volume of one or more cycloolefin monomers additionally comprises one or more components selected from the group consisting of impact modifiers, flame retardants, antioxidants, fillers, and reinforcing materials.

7. A method as in claim 2 wherein the volume of one or more cycloolefin monomers is heated to a temperature in the range of about 130° to 200° C. for a period of at least 0.25 hours.

8. A method as in claim 7 wherein the volume of one or more cycloolefin monomers is heated for a period in the range of about 1 to 24 hours.

9. A method as in claim 2 wherein from 5% to 50% by weight of the dicyclopentadiene monomers dissociate and react to form cycloolefin products of a molecular weight higher than dicyclopentadiene.

10. A method as in claim 9 wherein said cycloolefin products of a molecular weight higher than dicyclopentadiene are selected from the group consisting of cyclopentadiene trimers, cyclopentadiene tetramers, pheneyl-tetracyclododecene, phenyl-hexacycloheptadecene, ethylidene-hexacycloheptadecene, ethylidene-tetracyclododecene and phenylnorbornene, cyclopentadiene pentamers and methyl-hexacycloheptadecene.

11. A method as in claim 1 wherein the volume of one or more cycloolefin monomers is a polymerization feedstock for a ring-opening bulk polymerization procedure selected from the group consisting of reaction injection molding, reaction transfer molding and liquid injection molding.

12. A method as in claim 1 wherein the volume of one or more cycloolefin monomers is a polymerization feedstock for a ring-opening polymerization in solution or slurry.

13. A method for increasing the molecular weight and the number of ring structures of a dicyclopentadiene polymerization feedstock by heating a dicyclopentadiene polymerization feedstock to a temperature in the range of 130° C. to 200° C. for a period of at least 0.25 hours, wherein said dicyclopentadiene polymerization feedstock is maintained substantially free of the polymerization catalyst and co-catalyst system during heating and said dicyclopentadiene polymerization feedstock is of sufficient purity to provide a degree of conversion to dicyclopentadiene polymer greater than 95% upon polymerization with a metathesis catalyst system before and after heating, wherein the degree of monomer conversion to polymer is determined by thermal gravimetric analysis upon heating a polymerized sample up to about 400° C.

14. A method as in claim 13 wherein the dicyclopentadiene is heated for a period in the range of about 1 to 24 hours.

15. A method as in claim 13 wherein from 5% to 50% by weight of the dicyclopentadiene monomers dissociate and react to form cycloolefin products of a molecular weight higher than dicyclopentadiene.

16. A method as in claim 15 wherein the cycloolefin products of a molecular weight higher than dicyclopentadiene are selected from the group consisting of cyclopentadiene trimers, cyclopentadiene tetramers and cyclopentadiene pentamers.

17. A method as in claim 13 wherein the dicyclopentadiene monomers are a part of the polymerization feedstock for a ring-opening bulk polymerization procedure selected from the group consisting of reaction injection molding, resin transfer molding and liquid injection molding.

18. A method as in claim 13 wherein the dicyclopentadiene monomers are admixed with one or more components selected from the group consisting of impact modifiers, flame retardants, antioxidants, fillers and reinforcing materials.

19. A method of preparing a polymerization feedstock of one or more cycloolefin monomers having at least one norbornene group, said method comprising heating a mixture of one or more cycloolefin monomers of at least 99% purity and an additive component selected from the group consisting of impact modifiers, flame retardants, antioxidants, fillers, and reinforcing materials, to a temperature in the range of 130° C. to 200° C. for a period of at least 0.25 hours, wherein said mixture of one or more cycloolefin monomers is maintained substantially free of a polymerization catalyst and a cocatalyst system during heating.

* * * * *